United States Patent [19]

Rogalla

[11] Patent Number: 5,605,629
[45] Date of Patent: Feb. 25, 1997

[54] METHOD FOR THE REMOVAL OF NUTRIENTS CONTAINING CARBON, NITROGEN AND PHOSPHORUS

[76] Inventor: Frank A. Rogalla, 839 W. End Ave., Apt. 6-E, New York, N.Y. 10025

[21] Appl. No.: 421,227

[22] Filed: Apr. 13, 1995

Related U.S. Application Data

[63] Continuation-in-part of Ser. No. 923,433, Aug. 3, 1992, abandoned.

[51] Int. Cl.$^6$ ............................................. C02F 3/30
[52] U.S. Cl. ............................ 210/605; 210/615; 210/630; 210/903; 210/906; 210/921
[58] Field of Search ........................... 210/605, 906, 210/615–617, 629, 630, 903, 921

[56] References Cited

U.S. PATENT DOCUMENTS

| 4,253,966 | 3/1981 | Lebesgue et al. | 210/617 |
|---|---|---|---|
| 5,147,547 | 9/1992 | Savall et al. | 210/605 |
| 5,482,630 | 1/1996 | Lee et al. | 210/605 |

FOREIGN PATENT DOCUMENTS

| 0159535 | 3/1985 | European Pat. Off. . |
|---|---|---|
| 0302545 | 7/1988 | European Pat. Off. . |
| 0382340 | 10/1990 | European Pat. Off. . |
| 2604990 | 4/1988 | France . |
| 4001855 | 7/1991 | Germany . |
| 1580733 | 12/1980 | United Kingdom . |

*Primary Examiner*—Thomas G. Wyse
*Attorney, Agent, or Firm*—Rhodes, Coats & Bennett, L.L.P.

[57] ABSTRACT

The method is of the type wherein the raw or untreated water to be treated is made to circulate in cells or biofilters with submerged filtering beds working anaerobically and then aerobically or vice versa. A treatment module is used comprising at least two cells or biofilters in series (for example one biofilter under anaerobic conditions and one to five biofilters under aerobic conditions) in making phases of anaerobiosis and then aerobiosis alternate cyclically. The entry of flow to be treated takes place always in the anaerobic cell. Advantageously, each phase of the cycle is separated from another by a hold phase comprising a halt in the supply of water to be treated.

12 Claims, 1 Drawing Sheet

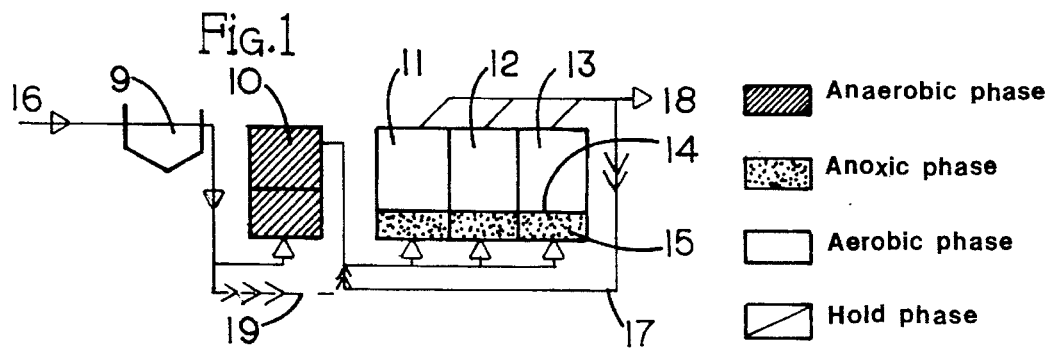
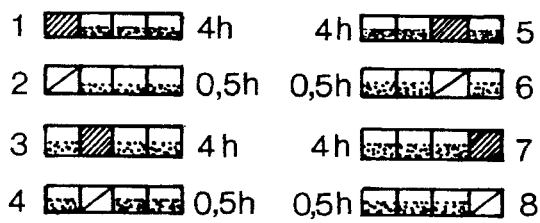
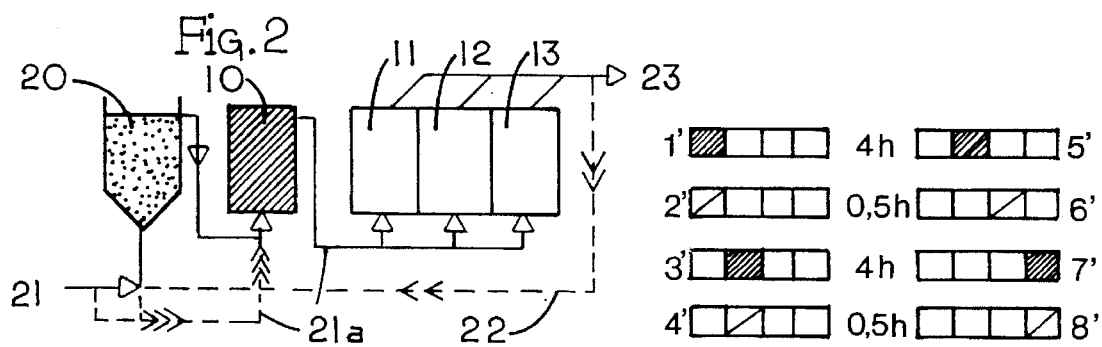
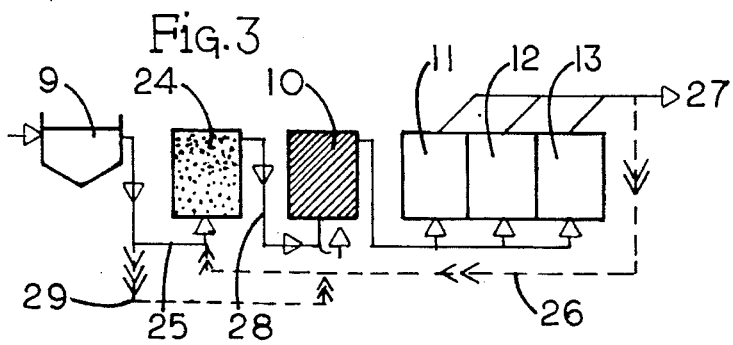

METHOD FOR THE REMOVAL OF NUTRIENTS CONTAINING CARBON, NITROGEN AND PHOSPHORUS

RELATED APPLICATION

This is a continuation-in-part of U.S. patent application Ser. No. 07/923,433, filed Aug. 3, 1992, now abandoned.

BACKGROUND OF THE INVENTION

1. Field of the Invention

The present invention relates to the field of the treatment of water with a view to its purification by biological means, notably discharge water and waste water or any water containing phosphorus in various forms and, possibly, ammonia nitrogen. It relates quite especially to a method designed to eliminate carbon, nitrogen and traces of phosphorus by biological dephosphatization on biofilters.

2. Description of the Prior Art

It is known that waste water can be treated by the biological method known as the activated sludge method wherein a biomass is kept in suspension in the presence of oxygen and carbon-containing nutriment. The bacteria present in the biomass degrade the polluted matter and are separated from the purified water in a clarifier. It is also possible to maintain autotrophic bacteria in the system, enabling the conversion of nitrogen ammonia into nitric nitrogen if a great sludge age of at least six days is adopted in the system. If a period of non-aerated (or anoxic) contact is incorporated into the system, it is possible to force the heterotrophic bacteria to degrade the nitrates in the presence of carbon-containing nutriment. If, moreover, the bacteria are made to undergo a systematic alternation of the anaerobic and aerobic states, an excess accumulation of phosphorus compounds can be caused in the bacteria.

A method such as this, with the above-described principles, has been known since 1974 under the process name of "BARDENPHO".

All the configurations currently available for the total elimination of nitrogen and phosphorus by biological means constitute variants of the above-mentioned standard activated sludge method. A variety of possible arrangements of the anaerobic, anoxic and aerobic zones has led to the development of several methods in the course of the past 20 years, notably those known by the names of Phostrip, A/0, Phoredox, UCT, Biodenipho, etc.

These configurations share the common feature of having an anaerobic basin at the front of the hydraulic flow designed to expose the biomass to an alternation of aerobic/anaerobic conditions. To reduce the nitrates in the anaerobic zone, several internal circuits for the recirculation of the sludges between anoxic and anaerobic zones are used in order to obtain efficient performance in terms of biological dephosphatization.

In these methods, several factors restrict the efficiency of the dephosphatization: these are notably the exposure time of the biomass to the anaerobic conditions which, most frequently, has to be limited to between 0.5 and 2 hours, and the value of load per mass which remain low because of the constraints on the age of the sludges dictated by the nitrification. This restricts the application of the methods in question to the treatment of effluents, for which the COD (chemical oxygen demand)/total P (phosphorus) ratio is high, notably higher than 20. It is difficult, in these methods, to obtain very low residual rates of phosphorus owing to the impossibility of increasing the load of carbon-containing nutriment for heterotrophic bacteria and owing to the fact that the subsequent clarifier releases suspended solids that are highly rich in phosphorus. Thus, it is necessary to add an additional physical/chemical process to the treatment of waste water to achieve a very low residual rate of phosphorus.

More recently, other methods for the purification of waste water have been proposed in which it is no longer activated sludge systems with freely circulating bacteria that are used but so-called "biofilter" reactors are used wherein the bacteria are fixed to a support. Among techniques of this kind, we may cite the processes described in the published French patents Nos. 2 604 990 and 2 632 947. These methods lead to excellent results in the elimination of carbon and nitrogen but, owing to the fixing of bacteria, it cannot provide for a satisfactory biological dephosphatization.

It has now been found that it is possible to resolve this problem of the high elimination of phosphorus in the operational context of biofilter methods by a technique which can be used to obtain a maximum rate of carbon-containing substrate in an anaerobic cell so as to achieve an absence of electron ($O_2$ and $NO_3$) acceptors during the non-aerated phase and minimize the losses of suspended solids (bacteria).

SUMMARY OF THE INVENTION

According to the essential characteristic of the method of the invention, to eliminate the carbon-containing and phosphorus-containing nutriments by the circulation of the waste water to be treated in biofilters with submerged filtering beds, successive phases of anaerobiosis and then aerobiosis are made to alternate cyclically in each cell or reactor, the entry of the flow to the cell or reactor to be treated taking place always in the filter under anaerobiosiso If it is furthermore desired to eliminate the nitrogen, nitrifying bacteria are placed in the submerged filtering beds.

A method such as this has numerous advantages which will emerge throughout the following description. In particular, the state of fixation of the biomass makes the period of stay of the bacteria in the cell or reactor independent of the hydraulic period of stay during the cyclical phases of the process within that cell. This enables the optimum exploitation of the capacities of storage and release of the phosphorus of the dephosphatizing colony. In addition, the carbon-containing substrate on the biomass under anaerobic conditions is always at an optimum rate owing to the volume of water that has undergone settling in the cells undergoing the anaerobic phase. Furthermore, the simultaneous filtration in the biofilters in series makes it possible to obtain good SS (suspended solids) indices at the treated water outlet and to reduce the loss of phosphorus-rich biomass in the effluent. Furthermore, according to an improvement of the method, the washing of the filtering cells can be done at the end of the aeration cycles with a simply nitrified (nitrate-rich) wash water. This makes it possible to prevent the release of phosphorus by the washing sludges during a subsequent settling operation. It will be noted, finally, that in the case of waste water to be treated where the COD/P ratio is very low, the process may be completed by a physical/chemical dephosphatization through the simple injection of the dephosphatization reagents at the outlet of the anaerobic phase where the effluent has a high concentration of P (from $PO_4$) after the release.

According to a particularly advantageous embodiment of the method of the invention, the alternation of the anaerobic and aerobic phases in each cell or reactor is separated by a hold phase where the conveyance of the flow to be treated in such cell is stopped.

In practice, for a cell in the anaerobic state, advantageously at least two aerobic cells are used in parallel therewith. The average periods of treatment in the above-mentioned cycle in each cell generally correspond to 1 hour to 8 hours for anaerobiosis, 0.5 to 1 hour for the hold phase and 4 hours to 24 hours for the aerobiosis.

According to one embodiment of the invention, in which three to five aerated cells are used for example, the circulation of water and of oxygenated gas in these cells takes place in ascending co-currents, the oxygenated gas being sent substantially to the middle of each cell.

According to a variant of the method, the raw or untreated water to be treated can be made to go, upstream from the system and according to the above-mentioned cycle, into a sludge bed reactor in the anoxic state. The untreated water is introduced in an upflow into this reactor.

According to another alternative embodiment, the flow of water to be treated can be made to go into a cell in the anoxic state positioned upstream from the treatment system according to the cycle of the method. For example, in this case, there will be the following elements in series: 1 anoxic cell, 1 anaerobic cell and 1 to 4 or more aerobic cells. The anoxic cell may also be placed downstream with respect to the set of anaerobic and aerated cells, provided that an external carbonated source is added.

BRIEF DESCRIPTION OF THE DRAWING

The invention shall be understood more clearly from the following more detailed description of embodiments, such as the above-described ones, made with reference to the figures in the single appended drawings sheet wherein:

FIG. 1 shows a filtering module for a set of filtering cells of a water purification station, comprising at a point in time during the cycle one anaerobic cell for three anoxic/aerobic cells;

FIG. 2 shows another filtering module of the same type as that of FIG. 1 but with the arrangement, at the starting or fore-part of the method, of an anoxic sludge bed reactor;

FIG. 3 shows another biofiltering assembly for a purification station in which, upstream from the set of anaerobic/aerobic cells, there is introduced an anoxic cell for the carrying out of the denitrification process which does not come under the above-mentioned alternation cycle.

The symbols used to denote each filtering cell (anaerobic, anoxic, aerobic and hold phases) are given at the top right-hand corner of the appended drawing.

Furthermore, for each of the three exemplary embodiments, a full cycle of alternating treatment according to the invention is given in concordance with each figure: 1 to 8, 1' to 8'; 1" to 8" with an indication, for each step, of the average time expressed in hours (h).

MORE DETAILED DESCRIPTION

In the configuration shown in FIG. 1, there is positioned, at the front or fore-part of the treatment module, first cell 10 in the anaerobic stage at the moment and then, in series, cells 11, 12, 13 (their number may go up to five) that are anoxic/aerobic at the same time. The set of cells may be preceded by a settling tank 9. Each filtering cell is provided with a floating or non-floating filtering bed, for example one with a material that is lighter for the water and has a granulometry of 2 to 6 mm. The aeration screen in the cells 11, 12, 13 is placed at the level 14 within the filtering bed so as to create an anoxic zone 15 within each cell in an aerobic state. The water to be treated (arrow 16) reaches the anaerobic cell 10 in an upflow, then a flow of water and air is introduced in ascending co-currents during the aerobic phase as indicated in FIG. 1. A part 17 of the throughput of treated effluent 18 is recirculated and mixed with the flow coming out of the anaerobic cell 10. According to the variant indicated by the dashes and the three arrows, a part 19 of the throughput of water that has undergone settling may be introduced directly into the anoxic zone 15 of the aerated cells 11, 12, 13 so as to promote the process of denitrification.

According to the configuration shown in FIG. 2, an anoxic upflow sludge blanket reactor 20 is positioned at the front of the treatment module so as to achieve the process of denitrification outside the filtration cells. The processes of oxidation of the organic phase, nitrification and biological dephosphatization, are carried out by the fixed biomass, as in the case of FIG. 1, on the carrier medium of the filtering cells. The sludge blanket in the reactor 20 is fed by all or a part of the untreated water 21 entering the station. The other part will be applied directly to the anaerobic pilot according to 21a (FIG. 2). According to one variant, a part 21a of the untreated water may be directed to the anaerobic filter 10. The reactor 20 also receives the recirculation throughput 22 of the effluent 23 from the aerobic cells. The reactor 20 thus plays the role of both a primary settling tank and a denitrification reactor. The water circuit is then set up in the treatment cells 10 to 13 in the same way as for FIG. 1.

According to an alternative configuration illustrated in FIG. 3, the major feature of the invention consists in the introduction of an anoxic cell 24, at the fore-part of the treatment module in an alternating cycle according to the invention. This cell 24 is designed for the denitrification process. It receives a part or all of the throughput 25 of water entering the station as well as the recirculation throughput 26 of the effluent 27 from the aerobic cells 11, 12, 13. The effluent 28 coming out of the anoxic cell 24 is entirely led into the anaerobic cells 10 and then into the aerobic cells 11, 12, 13. The cell 10, according to one variant, can also receive a part 29 of the throughput of water that has undergone settling. All the cells may be preceded by a settling tank 9.

A non-restrictive quantified example, for the implementation of the method in alternating cycles according to the invention, shall now be given on the basis of a configuration of the following type: an anaerobic cell followed by three aerobic cells such as, for example, the cells 10 and then 11, 12, 13 of the appended FIGS. 2 and 3. Each cell had a section of 4 meters and a height of 4 meters, and the submerged filtering bed, in each cell, occupied a height of 3 meters. The characteristics of the alternation cycle adopted were four hours for the anaerobic phase, 0.5 hours for the hold phase (the stopping of the feeding with water to be treated) and 12 hours for the aerobic phase. The mean characteristics of the untreated water to be treated were:

Total COD: 400 mg/l

N (of $NH_4$): 50 mg/l

P (of $PO_4^{3-}$): 10 mg/l

The speed of passage of the water to be treated into each aerobic reactor was about 0.95 m/h and obviously three times greater in the anaerobic reactor. The flow-rate of water to be treated was about 15 $m^3/h$.

The quantities applied in the implementation of the method were as follows:

Total COD: 5 kg COD/m$^3$ aerated/day

In N N(NH$_4$): 1 kg N (NH$_4$)/m$^3$ aerated/day

In N (of NO$_3$): 1 kg N(NH$_4$)/m$^3$ aerated/day the quality of the treated water, in the outflowing effluent, was very good, with the following characteristics:

total COD: 50 mg/l

N (of NH$_4$): less than 1 mg/l

Total phosphorus: less than 1 mg/l

What is claimed is:

1. A method of biologically treating wastewater to remove carbon and phosphorus utilizing submerged biofilters in a series of cell, comprising: directing wastewater into and through a series of cells and a submerged biofilter contained in each cell; during one phase of treatment maintaining a first cell and its biofilter under anaerobic conditions while maintaining a second cell and its biofilter under aerobic conditions and directing the effluent from the first anaerobic cell to the second aerobic cell; during a second phase of treatment reversing the anaerobic/aerobic cell treatment by maintaining the first cell and its biofilter under aerobic conditions while maintaining the second cell and its biofilter under anaerobic conditions and directing the influent from the second anaerobic cell to the first aerobic cell; and in each phase, directing wastewater into the cell that is maintained under anaerobic conditions prior to passing the wastewater into the cell maintained under aerobic conditions.

2. The method of claim 1 including the step of interposing a hold phase between selected phases of treatment by interrupting the flow of wastewater into the anaerobic cell.

3. The method of claim 2 wherein at least two cells and their biofilters are maintained under aerobic conditions while one cell and its biofilters are maintained under anaerobic conditions and wherein the average periods of treatment for the process include 1 to 8 hours for anaerobic treatment, 0.5 to 1 hour for the hold phase, and 4 to 24 hours for the aerobic treatment.

4. The method of claim 1 including utilizing 3 to 5 aerobic cells for each anaerobic cell.

5. The method of claim 4 including directing the effluent from the anaerobic cells to the 3 to 5 aerobic cells.

6. The method of claim 1 wherein water and air are circulated through the aerobic cells in ascending co-currents.

7. The method of claim 1 including the step of subjecting the wastewater to anoxic treatment prior to the wastewater being directed into an anaerobic cell.

8. The method of claim 7 wherein the anoxic treatment takes place in a sludge blanket reactor.

9. The method of claim 1 wherein the wastewater is subjected to anoxic treatment subsequently to being subjected to anaerobic treatment.

10. The method of claim 9 wherein aerobic treatment and anoxic treatment are both carried out in the same cell.

11. The method of claim 10 wherein the aerobic/anoxic treatment carried out in the same cell is accomplished by maintaining a portion of the biofilter anoxic in a certain section of the cell while maintaining another portion of the biofilter aerobic in another section of the cell.

12. The method of claim 1 including the step of removing nitrogen from the wastewater by utilizing nitrifying and denitrifying microorganisms in various cells of the process.

* * * * *